United States Patent [19]

Moore

[11] 4,453,088

[45] Jun. 5, 1984

[54] MULTIPLEX SYSTEM FOR STEERING WHEEL MOUNTED SWITCHES

[75] Inventor: George R. Moore, Englewood, Ohio

[73] Assignee: General Motors Corporation, Detroit, Mich.

[21] Appl. No.: 448,772

[22] Filed: Dec. 10, 1982

[51] Int. Cl.³ .............................................. H02J 1/00
[52] U.S. Cl. .................................. 307/10 R; 307/39;
307/115; 340/825.77
[58] Field of Search ................... 307/10 R, 29, 39, 86, 307/87, 116, 130, 115, 362; 340/825.77; 339/35

[56] References Cited

U.S. PATENT DOCUMENTS

| | | | |
|---|---|---|---|
| 4,028,620 | 6/1977 | Kitagawa et al. | 307/10 R X |
| 4,118,700 | 10/1978 | Lenihan | 307/116 X |
| 4,340,824 | 7/1982 | Shaw | 307/10 R X |

*Primary Examiner*—E. A. Goldberg
*Assistant Examiner*—Todd E. DeBoer
*Attorney, Agent, or Firm*—Albert F. Duke

[57] ABSTRACT

A multiplex system is disclosed in which a plurality of auxiliary switches are mounted on a vehicle steering wheel and are selectively actuable to transmit predefined current levels through the horn relay circuit. The respective current levels are decoded and utilized to generate respective control signals.

4 Claims, 1 Drawing Figure

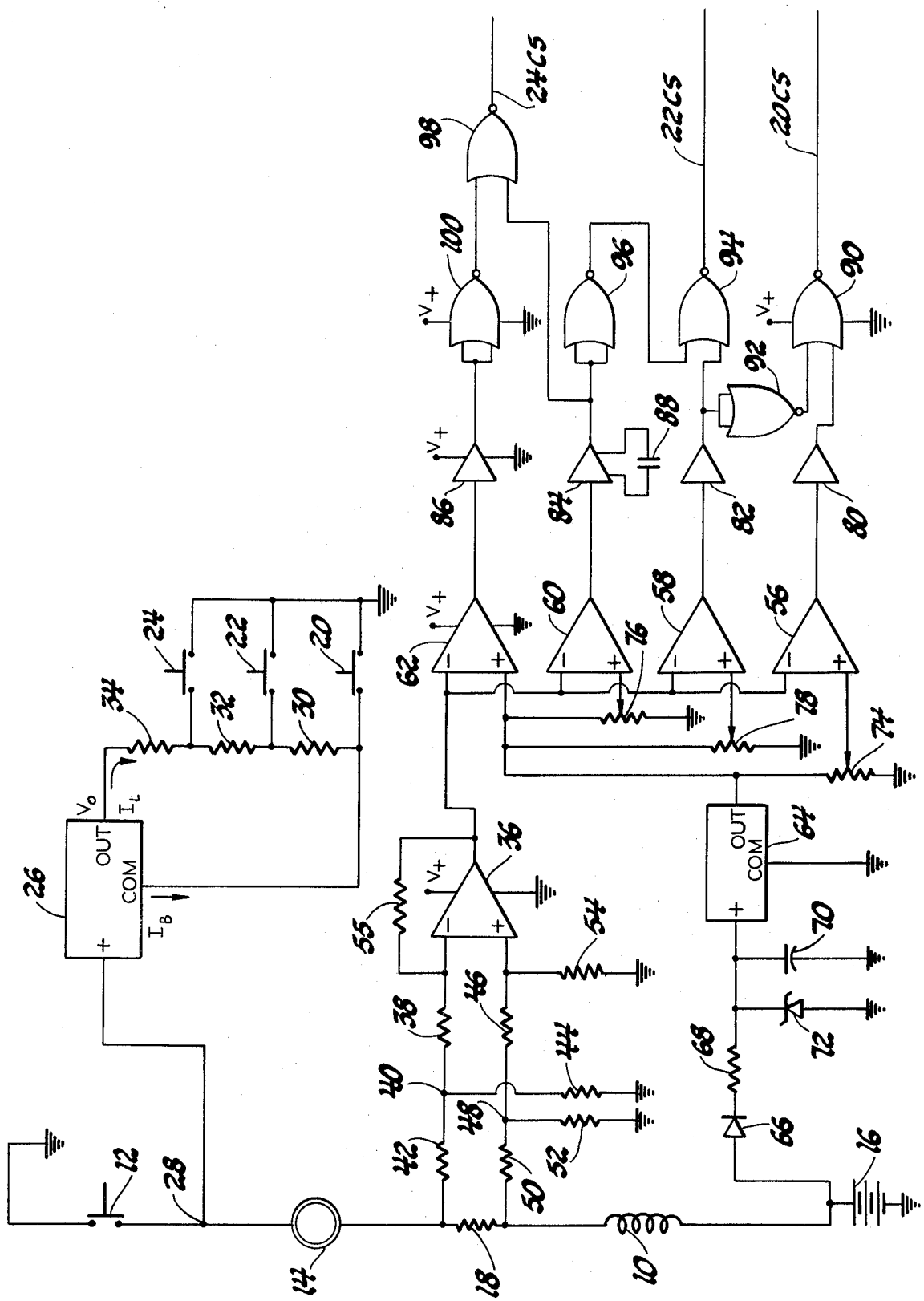

MULTIPLEX SYSTEM FOR STEERING WHEEL MOUNTED SWITCHES

FIELD OF THE INVENTION

This invention relates to multiplex systems utilizing the motor vehicle horn relay circuit as a means of transmitting encoded command signals from switches mounted on the steering wheel to remotely locate decoding logic and, more particularly, to such a system wherein the command signals are encoded as current levels through the horn relay circuit.

BACKGROUND OF THE INVENTION

Several proposals have been made to mount certain function switches on the vehicle steering wheel in order that they may be more conveniently available for actuation by the vehicle operator. Such switches may be those presently provided elsewhere, such as the cruise control, windshield wiper, windshield washer, headlamps dimming and turn signal switches. See, for example, U.S Pat. Nos. 3,670,174 and 4,340,824. The systems disclosed in each of these patents transmit distinct voltage levels associated with each switch closure through the slip ring of the vehicle horn circuit to decode circuitry which controls load devices intended to be energized in response to switch closure. There are several problems associated with this prior art approach. In order to maintain a quality connection and minimize voltage variations, an expensive slip ring is often required. Further, the horn switch is usually encoded along with the added switches because of the fairly narrow voltage range otherwise available for encoding the switches. This encoding of the horn switch degrades the reliability of the horn circuit. For example, under a low voltage condition it may not be possible to energize the horn.

SUMMARY OF THE INVENTION

It is an object of the present invention to provide an improved multiplex system of the type wherein a plurality of switches are mounted on the vehicle steering wheel and switch position data is transmitted via the single slip ring existing in the horn relay circuit.

It is another object of the present invention to provide such a multiplex system which has a greater immunity to variations in horn circuit resistance including slip ring and ground path connections.

It is another object of the present invention to provide such a multiplex system which can be expanded to a relatively large number of switches without substantially degrading the reliability of the system.

It is another object of the present invention to provide such a system which will provide advance warning of a malfunction in the horn relay circuit.

These and other objects and advantages of the present invention are attained by a multiplex system of the aforementioned type wherein switch position is encoded by generating distinct current levels through the horn relay circuit in response to switch closure.

BRIEF DESCRIPTION OF THE DRAWINGS

A more detailed understanding of the present invention may be had from the following detailed description which should be read in conjunction with the single drawing which is a schematic diagram of the invention.

DESCRIPTION OF THE PREFERRED EMBODIMENT

Referring now to the drawing, the conventional motor vehicle horn relay circuit includes a horn relay 10 connected in series with a horn switch 12 through a slip ring 14 across a vehicle battery 16. In accordance with the present invention, a shunt resistor 18 is connected between the horn relay 10 and the slip ring 14. The resistor 18 is of small resistance value, such as for example 1 ohm, and does not interfere with the operation of the horn relay 10. In addition to the horn switch 12, a plurality of momentary contact switches 20, 22 and 24 are mounted on the steering wheel. An integrated circuit voltage regulator 26, such as the MC78M06CT, has its input terminal connected to a junction 28 of the horn relay circuit and maintains a substantially constant output voltage $V_O$, at the output terminal, of for example 6 volts, relative to the voltage at the common terminal. The voltage regulator 26 is only energized upon closure of one of the switches 20, 22 or 24 and, consequently, draws no standby current. The current drawn through the resistor 18 by the regulator 26 depends upon which one of the switches 20, 22 and 24 is closed. When a switch is closed, the total current drawn is the sum of the regulator bias current $I_B$ plus the load current $I_L$. The bias current $I_B$ is constant at, for example, 6 mA., while the load current $I_L$ is the regulated voltage $V_O$ divided by the load resistance. The load resistance depends on which of the switches is closed. For example, if switch 20 is closed, the load resistance is the sum of the resistors 30, 32 and 34. If switch 22 is closed, the load resistance is the sum of the resistors 32 and 34 and if switch 24 is closed, the load resistance is the resistor 34. Thus, for each closure of one of the switches 20, 22 and 24, a distinct and predetermined current is drawn through the resistor 18.

The current through the resistor 18 is converted to a voltage and amplified by a differential amplifier 36 having its inverting input connected through a current limiting resistor 38 to a junction 40 of a voltage dividing network comprising resistors 42 and 44 connected between one side of the resistor 18 and ground. The noninverting input of the amplifier 36 is connected through a current limiting resistor 46 to the junction 48 of a voltage dividing network comprising resistors 50 and 52 connected between the other side of the resistor 18 and ground. The noninverting input of the amplifier 36 is connected to ground through a resistor 54 and the output is connected to the inverting input through a resistor 55. The output of the differential amplifier 36 is an amplified version of the voltage appearing across the resistor 18.

The output of the differential amplifier 36 is connected with the inverting input of comparators 56, 58, 60 and 62. The noninverting input of the comparator 62 is connected to the output of an IC voltage regulator 64 which provides a 6 volt output and is powered from the vehicle battery through a network including a protection diode 66, a resistor 68, filter capacitor 70 and Zener diode 72. The noninverting input of the comparator 56 is connected with the regulator 64 through a potentiometer 74 which establishes a first reference voltage level. Similarly, the noninverting inputs of the comparators 58 and 60 are connected with the regulator 64 through potentiometers 76 and 78 which establish second and third reference voltage levels. The reference voltage levels established at the noninverting inputs of comparators 56 and 58 are respectively below and above the voltage expected at the inverting inputs when the switch 20 is closed. Similarly, the voltage resulting from closure of switch 22 is between that established at the noninverting inputs of comparators 58 and 60 and when switch 24 is closed, the resulting voltage is between that established at comparators 60 and 62. The output of each comparator 56–62 is input to debounce circuitry 80, 82, 84 and 86 which may be formed from a single integrated circuit, such as the MC14490FP, and a timing capacitor 88. The debounce circuitry 80–88 ensures that the logic level outputs of the comparators 56–62 are present for a fixed time interval before the succeeding logic is activated. A NOR gate 90 receives one input from the comparator 56 and a second input from the comparator 58 through an inverter 92. The output of the gate 90 provides a control signal designated 20CS which indicates the status of switch 20. A NOR gate 94 receives one input from the comparator 58 and a second input from the comparator 60 through an inverter 96. The output of the gate 94 provides a control signal designated 22CS which indicates the status of switch 22. A NOR gate 98 receives one input from the comparator 60 and a second input from the comparator 62 through an inverter 100. The output of the gate 98 provides a control signal designated 24CS which indicates the status of switch 24.

The operation of the circuit shown in the drawing is as follows assuming a value of 100 ohms for each of the resistors 30, 32 and 34. With none of the switches 16, 20, 22 or 24 closed, current through the resistor 18 is zero and the voltage applied to the inverting inputs of the comparators 56–62 is zero. Accordingly, the outputs of the comparators 56–62 are high which disables the gates 90, 94 and 98 providing a low output from each of these gates. If the switch 20 is closed while the switches 22 and 24 remain open, a current of approximately 26 mA. is drawn through resistor 18 and will produce a voltage level at the output of the amplifier 36 which is between the voltage levels established by the resistors 74 and 76. Under these circumstances, the output of the comparator 58 remains high but the output of the comparator 56 switches low. This produces two low inputs to the gate 90 causing its output to go high indicating that the switch 20 is closed. If the switch 22 is closed while the switches 20 and 24 remain open, a current will be drawn through the resistor 18 of approximately 39 mA. producing a voltage level at the output of amplifier 36 which is between that established by the potentiometers 76 and 78. As a result, the output of the comparator 58 goes low which disables the gate 90 through the inverter 92, thus driving the output of the gate 90 low while at the same time providing a low input to the gate 94. Since the output of the comparator 60 is high, the inverter 96 causes the other input to the gate 94 to be low. With both inputs of the gate 94 low, its output is high indicating that the switch 22 is closed. If the switch 24 is closed, while the switches 20 and 22 remain open, a current of approximately 78 mA. is drawn through the resistor 18 producing a voltage level between that established by the potentiometer 78 and the voltage regulator 64. As a result, the output of the comparator 60 switches low which disables the gate 94 through the inverter 96 ensuring that the output of the gate 94 remains low. Since the output of the comparator 62 is high, the inverter 100 provides one low input to the gate 98. Comparator 60 provides a second low input to the gate 98 causing its output to go high indicating that the switch 24 is closed. If the horn switch 16 is closed while the switches 20, 22 and 24 are open, at least 500 MA is drawn through the resistor 18, producing a voltage at the inverting inputs of the comparators 56–62 which is higher than that produced at the noninverting input of each of the comparators 56–62. With the output of each of the comparators 56–62 being driven low as a result of closure of the horn switch 16, the gate 98 is disabled by the comparator 62 low output, the gate 94 is disabled by the low output from the comparator 60, and the gate 90 is disabled by the low output from the comparator 58.

In the arrangement shown, the switch 24 has the highest priority, switch 22 has next highest priority and switch 20 has the lowest priority. That is to say, the voltage set by the potentiometer 78 establishes a voltage window between it and the output of the regulator 64 which is wider than any voltage variations resulting from closure of either of the switches 20 or 22 in combination with the switch 24. Likewise, the voltage set by the potentiometer 76 forms a voltage window with that established by the potentiometer 78 such that the voltage generated by closure of the switch 20, while the switch 22 is closed, remains within the window. The voltage set by the potentiometer 74 is less than that voltage established at the output of the amplifier 36 when the switch 20 is closed. It will be appreciated that even though all the resistors 30, 32 and 34 are identical, there is a sufficient current variations through the resistor 18 as a result of selective closure of any of the three switches 20–24 to permit switch closures to be readily decoded. Moreover, the encoding scheme of the present invention permits easily allocation of priority to switches without different values of resistance for the resistors 30, 32 and 34. Furthermore, it will be noted that a malfunction in the multiplex circuitry which is added to the horn circuit (other than the resistor 18), has no effect on the horn circuit so that its reliability is not degraded. On the other hand, if the horn relay 10 should open circuit rendering the horn circuit inoperative, this would be detected during operation of any of the switches 20, 22 or 24 and thus would provide an advance warning of the horn relay circuit's inoperability.

The embodiments of the invention in which an exclusive property or privilege is claimed are defined as follows:

1. In a motor vehicle having a horn circuit including a horn relay connected in series with a horn switch, through a slip ring, the improvement comprising a resistor connected in series with said horn relay, a plurality of auxiliary switches, means connecting said auxiliary switches to a junction between said slip ring and said horn switch for drawing predetermined load currents through said resistor in response to actuation of selected ones of said auxiliary switches, means responsive to the voltage across said resistor for providing a command signal corresponding to each of said predetermined load currents.

2. In a motor vehicle having a horn circuit including a horn relay connected in series with a horn switch through a slip ring, the improvement comprising a resistor connected in series with said horn relay, at least first and second auxiliary switches, means responsive to closure of said first or second auxiliary switches for causing first or second currents respectively to flow through said resistor, means responsive to the voltage across said resistor for providing a first command signal when said first auxiliary switch is actuated and a second command signal when said second auxiliary switch is actuated.

3. In a motor vehicle having a steering wheel and means including a slip ring providing electrical continuity between a grounded horn switch mounted on said steering wheel and a horn relay located remotely from said steering wheel and connected with a source of direct current potential, the improvement comprising a shunt resistor connected in series with said horn relay between said slip ring and said horn relay for sensing current through said horn relay, voltage regulator means having an input node connected to a junction between said slip ring and said horn switch, and producing a substantially constant voltage at an output node relative to a common node, a plurality of load resistors connected in series between said output node and said common node, a plurality of auxiliary switches of equal number to said plurality of load resistors, one of said auxiliary switches connecting said common node to ground, each of the remaining auxiliary switches connected between ground and a junction between two of said load resistors, whereby actuation of each of said auxiliary switches causes a predetermined level of current flow through said shunt resistor, means responsive to the voltage across said shunt resistor for providing a command signal corresponding to each of said predetermined current levels.

4. In a motor vehicle having a steering wheel and means including a slip ring providing electrical continuity between a grounded horn switch mounted on said steering wheel and a horn relay located remotely from said steering wheel and connected with a source of direct current potential, the improvement comprising a shunt resistor connected in series with said horn relay between said slip ring and said horn relay for sensing current through said horn relay, voltage regulator means having an input node connected to a junction between said slip ring and said horn switch, and producing a substantially constant voltage at an output node relative to a common node, at least first and second load resistors of the same value connected in series between said output node and said common node, first and second auxiliary switches having one side grounded, the other side of said first auxiliary switch connected with said common node, the other side of said second auxiliary switch connected to a junction between said first and second load resistor, whereby actuation of said first auxiliary switch causes a first current to flow through said shunt resistor and actuation of said second switch causes a second current to flow through said shunt resistor, first and second output devices, differential amplifier means responsive to the voltage across said shunt resistor, and decode means responsive to the output of said differential amplifier means for selectively energizing said first and second output devices as a function of the output voltage of said differential amplifier means.

* * * * *